Dec. 28, 1937.   F. C. BLANCHARD   2,103,763
FLUID PRESSURE RESPONSIVE FEEDER
Filed Jan. 11, 1935

Inventor:
Frederick C. Blanchard,
by Emery, Booth, Varney & Townsend
Att'ys

Patented Dec. 28, 1937

2,103,763

UNITED STATES PATENT OFFICE 2,103,763

FLUID PRESSURE RESPONSIVE FEEDER

Frederick C. Blanchard, Brookline, Mass.

Application January 11, 1935, Serial No. 1,360

20 Claims. (Cl. 184—7)

This invention relates to a novel and improved pressure fluid responsive feeder for use in a lubricating system in which the lubricant to be fed to one or more bearings is subjected to pulsating pressure which cause the feeder or feeders to open and close. In one such system the feeders are connected to a supply pipe to which lubricant is supplied in excess of the requirements of all feeders by a pump which draws lubricant from a reservoir, circulates the lubricant through the supply pipe, past the feeders and returns the excess lubricant to the reservoir, and there is associated with the pump means for establishing a predetermined minimum pressure (which may be, for example, from four to fifteen pounds) to which the feeders will not respond, and for increasing the pressure abruptly at predetermined intervals to a predetermined maximum pressure (for example, sixty to one hundred and fifty pounds) to which the feeders will respond and feed lubricant to the bearings, the amount fed to each bearing being predetermined by the setting of the feeder for such bearing and being independent of the amount or amounts fed to the other bearing or bearings by the other feeder or feeders. One such system is disclosed in Patent No. 1,900,754 issued to me March 7, 1933. The feeder may also be used in connection with variations of that system, as, for example, one in which the main supply pipe does not return to the reservoir but the pulsations are applied to the incoming end of a standing column of lubricant.

The invention will best be understood by reference to the following description when taken in connection with the accompanying drawing of illustrative embodiments thereof, while its scope will be pointed out more particularly in the appended claims.

Figure 1:
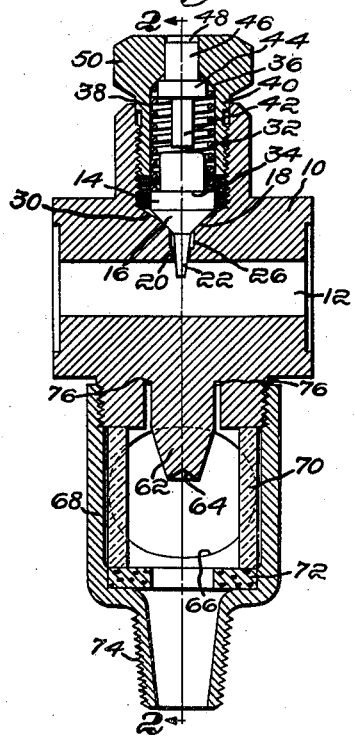
Fig. 1 is a central vertical sectional view of a pressure fluid responsive feeder embodying the invention.

Referring to the drawing and to the embodiment of the invention illustrated therein by way of example, and having reference at first to Fig. 1, there is shown a fluid pressure responsive feeder comprising a body or casing 10 provided with a supply passage 12 intended to be connected with the source which supplies oil to one or more feeders. In this example the passage 12 is a through passage and the feeder illustrated is designed for assembly with one or more other similar feeders placed end to end as a "gang", in which case the passages 12 of the several feeders constitute in effect a single passage. In case the feeder is to be used as a "dead end" feeder, the passage 12 will be closed at one end. Sometimes also in practice the feeder is designed as an elbow, in which case the passage 12 has two portions, one transverse to the other.

Figure 3:
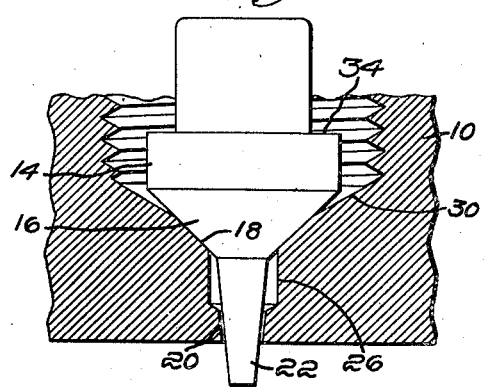
Fig. 3 is a view on an enlarged scale showing a portion of Fig. 1.
Figure 4:
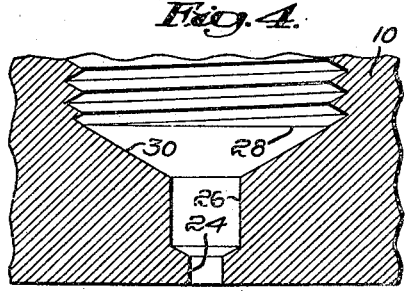
Fig. 4 is a sectional view illustrating a step in one method of making the valve seat and the metering orifice of the feeder.

The valve (using the term in a general sense), which is to be opened and closed by the pressure pulsations, herein comprises a member 14 having a conical portion 16 constituting the valve per se cooperating with a seat 18, herein formed as a part of the casing 10, the angle of the cone in the present example being approximately forty-five degrees. Between the valve seat and the supply passage 12 there is a metering orifice 20 (best shown in Fig. 3) which is controlled by a metering element, herein a metering pin 22. This pin has a very slight taper such as three degrees to its longitudinal axis. One convenient method of preparing the valve seat and the metering orifice is first to machine the valve casing 10 by the use of three drills of different sizes, a small drill to drill a hole 24, a larger drill to drill a hole 26, and a still larger drill to drill a hole 28, all of which are coaxial. The hole 24 is drilled somewhat smaller than the orifice 20 is to be, and the cutting edges of the drill, which produce the hole 28, leave the bottom of the latter with an angular surface 30 which is approximately sixty degrees to the common axis of the holes. The next step is to drop into place the member which constitutes the valve and metering pin, and to drive the latter downwardly with sufficient force to enlarge and to taper the hole 24 to correspond with the metering pin and to shape the seat 18 to the desired angle (herein forty-five degrees). In practice the valve and metering pin are made of steel and the valve casing is made of brass which is relatively softer than the steel and capable of being shaped by driving the valve and metering pin downwardly as described. The valve and metering pin are then lifted out and the metering orifice is next slightly enlarged on the same taper as the metering pin as by the use of a suitable tapered drift pin, the amount of the enlargement being carefully predetermined by limiting the travel of the drift pin so as to produce a metering orifice which, in the lowest position of the metering pin, will afford a minimum effective clearance of a few ten-thousandths of an inch. This clearance space permits the lower end of the valve to be subjected to the pressure of the oil within the supply passage 12, thereby to lift the valve from its seat and to retract the metering pin within its orifice.

The valve is arranged to respond to a predetermined pressure in the supply passage 12 as by being loaded by a spring 32 (see Fig. 1) whose lower end rests against an abutment 34 on the valve, and whose upper end rests against a movable abutment which in this example is a shoulder 36 at the upper end of an axial chamber 38 in a screw 40 which is threaded into valve casing 10. The spring is "scaled" (i. e. made the desired strength) to hold the valve on its seat until the desired opening pressure occurs. The amount which the valve will open, and the corresponding effective area of the metering orifice, is determined by an appropriate stop, herein a pin 42 having an enlargement 44 to center the spring 32, and having a body 46 which is tightly fitted into an axial hole 48 drilled in the screw 40. By rotating the screw 40 in the proper direction, the gap between the lower end of the stop pin 42 and the upper end of the valve member 14 may be varied to predetermine the rate of feed. It is recognized that the adjustment will vary the stress of spring 32 somewhat, but the effect upon the spring is so slight that it can be ignored.

To facilitate turning of the screw 40, the latter herein is provided with a polygonal head 50. In case it should be desired to prevent unauthorized persons from altering the rate of feed, a modification shown in Fig. 5 may be employed. In this form, there is a screw 40' whose thread tightly fits the thread in the valve casing. In manufacture, this screw initially is provided with a polygonal head to which a wrench may be applied to obtain the desired adjustment in assembly, after which the polygonal head is machined to present a smooth cylindrical surface, as hereinafter described, so that the screw cannot afterward be adjusted except by the use of a gripping tool. There is provided a stop pin 42' which, instead of being fixed in relation to the screw, is axially adjustable therein as by having screw threaded engagement therewith. This is conveniently accomplished by providing the pin 42' with a body portion 46' externally threaded to engage the screw 40' which is internally threaded. The top of this body is provided with a polygonal socket 52 to receive an appropriate wrench to be inserted through an opening 54 provided in the upper end of the screw 40', and the upper end of the screw is provided with an inwardly directed annular flange 56 which overlies the upper end of the screw threaded body 46' to limit upward movement of the latter.

The feeder is assembled with the screw 46' in its extreme upward position against the flange 56. The hollow screw 40' (whose thread fits the thread in the valve casing rather tightly) is then set in position to provide the desired gap between the lower end of the stop screw 42' and the upper end of the valve member 14 for the predetermined feed rate. The exposed surface of the hollow screw 40' is then machined to form a cylindrical surface which will prevent this screw from being turned once it is assembled with the valve body. When the screw 46' is against the flange 56, the feeder operates at the desired, predetermined feed rate. A person not having the proper wrench to insert in the opening 52 cannot change the adjustment of the feeder.

If, however, it becomes desirable at any time to stop the feed altogether, a person provided with the proper wrench can turn the screw 46' downwardly until the gap between the lower end of the stop pin 42' and the upper end of the valve member 14 is closed, so that the valve cannot open. When, subsequently, it is desired to operate the feeder again, the screw 46' carrying the stop pin 42' can be backed up until the screw reaches the flange 56, with the assurance that the former predetermined feed rate will be resumed.

Figure 5:
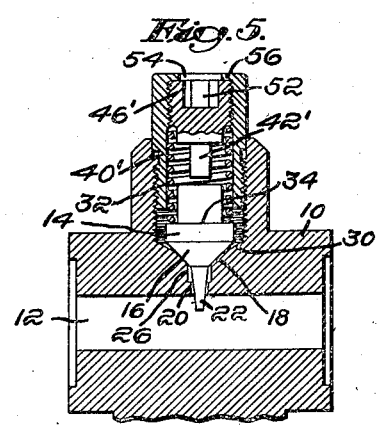
Fig. 5 is a sectional view similar to the upper portion of Fig. 1 illustrating a modification of the arrangement for adjusting the rate of feed of the feeder.

This feeder shown in Fig. 5 is therefore intended primarily as a non-adjustable feeder with a feed rate predetermined by the placing of the hollow screw 40' before the exposed surface of the latter is machined into cylindrical form. This is an important and valuable feature of the form shown in Fig. 5. However, the construction is such that this feeder may nevertheless be used as an adjustable feeder by inserting a wrench in the socket 52 and turning the screw 46' to lower the stop pin 42' to decrease the gap between the latter and the valve member 14.

Returning now to the metering pin, the function of the latter, in both forms of the invention, is to afford an accurate feed control, this being accomplished by the slight taper of the pin and the orifice so that a very considerable adjustment of the stop pin is required to produce a slight increase or decrease of the rate of feed through the metering orifice. There is sufficient initial clearance of the metering pin in its orifice to prevent the pin from sticking, and the angle of the valve and its seat is such that the valve cannot possibly stick in its seat. The pressure of the oil being exerted on the comparatively large exposed surface at the lower end of the valve, when the oil pressure increases to a point where the resistance of the loading spring is overcome, the metering pin and the valve are forced definitely in an upward direction. When the pressure again drops to a point below the pressure which is predetermined by the adjustment of the loading spring, the valve and the metering pin will resume their initial position, thus preventing any further discharge of oil until the next pressure pulsation occurs. The described construction is such that with each lifting of the valve and the metering pin, any particles of matter suspended in the oil are carried upwardly and are prevented from interfering with the proper seating action of the valve.

In either form of the invention, to stop the feed altogether, the stop pin may be lowered until the valve cannot open, and yet there is no danger of the valve being so forcibly seated as to stick. Hence, when subsequently the stop pin is backed up to the proper point, the desired rate of feed is restored.

Figure 2:
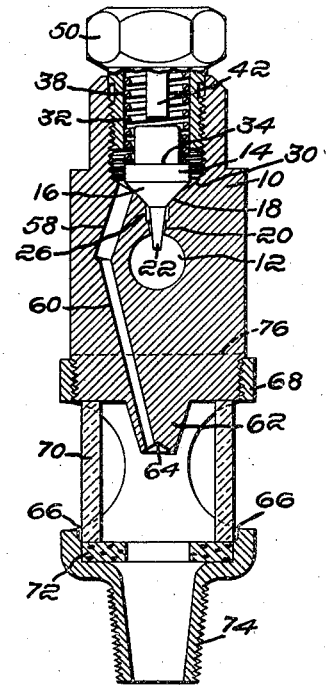
Fig. 2 is a sectional view on line 2—2 of Fig. 1.

As herein shown, the valve and its seat are above the supply passage 12, and when the valve opens oil is permitted to flow upwardly past the valve into the chamber above the valve seat and the oil then gravitates through passages 58 and 60 (see Fig. 2) to a nozzle 62 presenting an outlet 64. The rate of feed is readily observable through openings 66 in a casing 68 which is threaded onto the valve casing and holds a glass tube 70 whose upper end is seated against the valve casing and whose lower end is seated against a gasket 72 which is held under compression. The casing 68 presents a threaded nipple 74 to be screwed into an appropriate opening in or adjacent the bearing to be lubricated.

In the operation of the feeder the sudden opening of the valve in response to the abrupt increase of the pressure overcomes any tendency of the oil to form a film over the feeding opening, and the opening being above the column of oil in the supply passage serves as a safeguard to prevent foreign matter heavier than the oil itself from interfering with the proper operation of the valve. To prevent the formation of a vacuum within the sight tube 70 the space within the latter is vented to the atmosphere as by providing the valve body with two slots 76 (see Fig. 1) which extend above the upper edge of the casing 68.

Having thus described one embodiment of the invention, but without limiting myself thereto, what I claim and desire by Letters Patent to secure is:

1. In a fluid pressure responsive feeder for a lubricating system in which the lubricant to be fed to one or more bearings is subjected to pulsating pressure, the combination of a valve seat, a valve which is normally seated on said seat and which is unseated and reseated in response to pressure pulsations, and a metering device having an orifice whose area increases toward said valve and through which orifice the lubricant flows to said valve to unseat the latter, said metering device including a metering element operated by said valve and cooperating with said orifice to increase the effective area of the latter to a predetermined amount when said valve is unseated.

2. In a fluid pressure responsive feeder for a lubricating system in which the lubricant to be fed to one or more bearings is subjected to pulsating pressure, the combination of a valve seat, a valve which is normally seated on said seat and which is unseated and reseated in response to pressure pulsations, a spring which tends to seat said valve and which maintains said valve seated during the period of the low pressure of the lubricant and yields and permits said valve to be unseated when the lubricant pressure acting on said valve rises to a predetermined point, and a metering device having an orifice whose area increases toward said valve and through which orifice the lubricant flows to said valve to unseat the latter, said metering device including a metering element carried by said valve and cooperating with said orifice to increase the effective area of the latter to a predetermined amount when said valve is unseated.

3. In a fluid pressure responsive feeder for a lubricating system in which the lubricant to be fed to one or more bearings is subjected to pulsating pressure, the combination of a valve seat, a valve which is normally seated on said seat and which is unseated and reseated in response to pressure pulsations, a spring which tends to seat said valve and which maintains said valve seated during the period of the low pressure of the lubricant and yields and permits said valve to be unseated when the lubricant pressure acting on said valve rises to a predetermined point, a metering device having an orifice whose area increases toward said valve and through which orifice the lubricant flows to said valve to unseat the latter, said metering device including a metering element carried by said valve and cooperating with said orifice to vary the effective area of the latter, and a stop which limits the opening movement of said valve and also limits the movement of said metering element.

4. In a fluid pressure responsive feeder for a lubricating system in which the lubricant to be fed to one or more bearings is subjected to pulsating pressure, the combination of a valve seat, a valve which is normally seated on said seat and which is unseated and seated in response to pressure pulsations, and a metering device having an orifice through which the lubricant flows to said valve and exerts a pressure thereon constantly tending to unseat the latter, and a metering pin operated by said valve and having a surface within said orifice and constantly exposed to the pressure of the oil, the cross-sectional area of said pin increasing in the direction of the lubricant flow toward said valve, thereby to increase the effective area of said orifice as said valve moves from said seat.

5. In a fluid pressure responsive feeder for a lubricating system in which the lubricant to be fed to one or more bearings is subjected to pulsating pressure, the combination of a valve seat, a valve which is normally seated on said seat and which is unseated and seated in response to pressure pulsations, and a metering device having an orifice through which the lubricant flows to said valve to unseat the latter, a metering pin operated by said valve and having a surface within said orifice and constantly exposed to the pressure of the oil, the cross-sectional area of said pin increasing in the direction of the lubricant flow toward said valve, thereby to increase the effective area of said orifice as said valve moves from said seat, the oil pressure acting through said orifice on said valve and constantly tending to unseat the latter, and a stop which predetermines the travel of said metering pin in said direction.

6. In a fluid pressure responsive feeder for a lubricating system in which the lubricant to be fed to one or more bearings is subjected to pulsating pressure, the combination of a valve seat, a valve which is normally seated on said seat and which is unseated and seated in response to pressure pulsations, and a metering device having an orifice through which the lubricant flows to said valve and constantly exerts thereon a pressure constantly tending to unseat the latter, said metering device including a metering pin operated by said valve and having a surface within said orifice and constantly exposed to the pressure of the oil, the cross-sectional area of said pin increasing in the direction of the lubricant flow toward said valve, thereby to increase the effective area of said orifice as said valve moves from said seat, and a stop which predetermines the travel of said metering pin in said direction, said valve and said seat cooperating to predetermine the travel of said metering pin in the opposite direction.

7. In a fluid pressure responsive feeder for a lubricating system in which the lubricant to be fed to a bearing is subjected to pulsating pressure, the combination of a valve which opens and closes in response to the pressure pulsations and which opens in the direction of the flow of lubricant through said valve, and a metering device which is operated by said valve and which predetermines the amount of lubricant fed to the bearing with each opening of said valve, said metering device having an orifice which increases in area as said valve opens and decreases in area as said valve closes.

8. In a fluid pressure responsive feeder for a lubricating system in which the lubricant to be fed to a bearing is subjected to pulsating pressure, the combination of a valve which opens and closes in response to the pressure pulsations and which opens in the direction of the flow of lubricant through said valve, and a metering device which is operated by said valve and which predetermines the amount of lubricant fed to the bearing with each opening of said valve, said metering device comprising two relatively movable parts one of which is carried by said valve, one of said parts having an orifice through which the lubricant flows and the other of said parts being arranged to cooperate with said orifice to vary the effective area of said orifice.

9. In a fluid pressure responsive feeder for a lubricating system in which the lubricant to be fed to a bearing is subjected to pulsating pressure, the combination of a valve which opens and closes in response to the pressure pulsations and which opens in the direction of the flow of lubricant through said valve, and a metering device which is operated by said valve and which predetermines the amount of lubricant fed to the bearing with each opening of said valve, said metering device comprising two relatively movable parts one of which is carried by said valve, one of said parts having an orifice through which the lubricant flows and the other of said parts being arranged to cooperate with said orifice to vary the effective area of said orifice, and a stop to limit the relative movement of said parts in the direction in which said effective area is increased.

10. In a fluid pressure responsive feeder for a lubricating system in which the lubricant to be fed to a bearing is subjected to pulsating pressure, the combination of a valve which opens and closes in response to the pressure pulsations and which opens in the direction of the flow of lubricant through said valve, and a metering device which is operated by said valve and which predetermines the amount of lubricant fed to the bearing with each opening of said valve, said metering device comprising two relatively movable parts one of which is carried by said valve, one of said parts having an orifice through which the lubricant flows and the other of said parts being arranged to cooperate with said orifice to vary the effective area of said orifice, and a stop to limit the relative movement of said parts in the direction in which said effective area is increased, said stop being adjustable in the direction of travel thereby to limit the extent of said travel.

11. In a fluid pressure responsive feeder for a lubricating system in which the lubricant to be fed to a bearing is subjected to pulsating pressure, the combination of an upwardly opening valve which opens and closes in response to the pressure pulsations and which opens in the direction of the flow of lubricant upwardly past said valve, a variably opening metering device which is below said valve, said metering device having an orifice through which the lubricant flows upwardly to and past said valve, and a part which is lifted by said valve when said valve opens and which varies the area of the opening, and a vertically adjustable stop to limit the upward travel of said valve and said part.

12. In a fluid pressure responsive feeder for a lubricating system in which the lubricant to be fed to a bearing is subjected to pulsating pressure, the combination of an upwardly opening valve which opens and closes in response to the pressure pulsations and which opens in the direction of the flow of lubricant upwardly past said valve, a variably opening metering device which is below said valve, said metering device having an orifice through which the lubricant flows upwardly to and past said valve, and a part which is lifted by said valve when said valve opens and which varies the area of the opening, and a vertically adjustable stop to limit the upward travel of said valve and said part, the downward travel of said part being limited by said valve.

13. In a fluid pressure responsive feeder for a lubricating system in which the lubricant to be fed to a bearing is subjected to pulsating pressure, the combination of a casing having a supply passage, a metering orifice through which the lubricant flows from said supply passage, and a valve seat through which the lubricant flows after it leaves said metering orifice, a valve which is normally seated on said seat and which is moved from said seat in the direction of the flow of the lubricant past said valve and which is moved from said seat by an increase of pressure in said supply passage, and a metering element carried by said valve and cooperating with said orifice to increase the effective area of the latter as said valve moves from said seat.

14. In a fluid pressure responsive feeder for a lubricating system in which the lubricant to be fed to a bearing is subjected to a pulsating pressure, the combination of a valve which opens and closes in response to the pressure pulsations, a metering device comprising two relatively movable parts, one of which is carried by said valve, said parts forming a metering orifice which varies in area as said parts are moved relatively to each other, and an adjustable stop by which the relative travel of said parts and the consequent effective area of said orifice may be varied.

15. In a fluid pressure responsive feeder for a lubricating system in which the lubricant to be fed to a bearing is subjected to a pulsating pressure, the combination of a valve which opens and closes in response to the pressure pulsations, a metering device comprising two relatively movable parts, one of which is carried by said valve and is constantly exposed to the pressure of the oil, said parts forming a metering orifice which varies in area as said parts are moved relatively to each other, the oil pressure acting through said orifice on said valve and constantly tending to unseat the latter, a stop by which the relative travel of said parts is limited, and an adjusting screw by which said stop may be moved to vary the effective area of said orifice.

16. In a fluid pressure responsive feeder for a lubricating system in which the lubricant to be fed to a bearing is subjected to a pulsating pressure, the combination of a valve which opens and closes in response to the pressure pulsations and is constantly exposed to the pressure of the oil which constantly tends to unseat said valve, a metering device comprising two relatively movable parts, one of which is carried by said valve and is constantly exposed to the pressure of the oil, said parts forming a metering orifice which varies in area as said parts are moved relatively to each other, a stop by which the relative travel of said parts is limited, a screw by which said stop may be moved to stop the feed by preventing said valve from opening, and a housing about the sides of said screw and presenting an inwardly directed projection which overlies one end of said screw and predetermines the effective area of said orifice when said valve is opened by the pressure of the lubricant.

17. In a fluid pressure responsive feeder for a lubricating system in which the lubricant to be fed is subjected to a pulsating pressure, the combination of a valve which opens and closes in response to the pressure pulsations, a metering device comprising two relatively movable parts, one of which is carried by said valve, said parts forming a metering orifice which varies in area as said parts are moved relatively to each other, a movable stop which limits the opening of said valve and which may be moved in one direction to prevent said valve from opening, and an abutment which limits the movement of said movable stop in the opposite direction.

18. In a fluid pressure responsive feeder for a lubricating system in which the lubricant to be fed is subjected to a pulsating pressure, the combination of a valve which opens and closes in response to the pressure pulsations, a metering device comprising two relatively movable parts, one of which is carried by said valve, said parts forming a metering orifice which varies in area as said parts are moved relatively to each other, a stop by which the relative travel of said parts is limited, an adjusting screw by which said stop may be moved to vary the effective area of said orifice, and a housing about the sides of said screw and presenting an inwardly directed projection which overlies one end of said screw and limits the adjustment of said screw and predetermines the maximum area of said orifice.

19. In a fluid pressure responsive feeder for a lubricating system in which the lubricant to be fed is subjected to pulsating pressure, the combination of a valve which opens and closes in response to the pressure pulsations, an adjustable metering device which predetermines the amount of lubricant fed to the bearing with each opening of said valve, said metering device including two members, one carried by said valve and cooperating with the other to vary the feed, an abutment which normally limits opening of said valve and which is adjustable toward and into engagement with said valve to prevent the latter from opening, thereby to stop the feed, and which is adjustable from said valve to permit the latter to open, and a second abutment which limits adjustment of the first-mentioned abutment from said valve, said second abutment being adjustable toward and from said valve.

20. In a fluid pressure responsive feeder for a lubricating system in which the lubricant to be fed is subjected to a pulsating pressure, the combination of a valve which opens and closes in response to the pressure pulsations, a metering device which predetermines the amount of lubricant fed to the bearing with each opening of said valve, said metering device comprising two parts presenting together an orifice which is variable by movement of one of said parts, such part being carried by said valve, a movable stop which limits opening of said valve and which may be moved in one direction to prevent said valve from opening, an abutment which limits movement of said movable stop in the opposite direction, and means by which the position of said abutment may be set to cooperate with said stop and said valve to predetermine the normal feed rate by limiting the opening of said valve.

FREDERICK C. BLANCHARD.